Oct. 6, 1970  R. HAYS ET AL  3,531,869

INSERT MOLDED EYEGLASS FRAMES

Filed May 22, 1968

RUPERT F. HAYS
JOHN M. PHILLIPS
RAMON D. CRISS
EDMUND D. HALL
INVENTOR.

BY Hubert Miller
ATTORNEY

United States Patent Office 3,531,869
Patented Oct. 6, 1970

3,531,869
INSERT MOLDED EYEGLASS FRAMES
Rupert F. Hays and John M. Phillips, Wichita, Kans., Ramon D. Criss, 1606 Sunset Drive, Augusta, Kans. 67010, and Edmund D. Hall, Wichita, Kans.; said Hays, said Phillips, and said Hall assignors to said Criss
Filed May 22, 1968, Ser. No. 731,115
Int. Cl. B23q 35/42
U.S. Cl. 33—174    4 Claims

ABSTRACT OF THE DISCLOSURE

An ophthalmic eyeglass frame with a pair of inserts molded in the lens openings forming lens grooves in the frame. The inserts are removable from the frame and utilized as patterns for shaping and edging the outline of the lenses.

BACKGROUND OF THE INVENTION

In the field of ophthalmic eyewear, one method of forming eyeglass frames is by injection molding with materials such as nylon. After the frame has been removed from the mold, a lens groove is cut around the inside of each lens opening with a routing tool. The grooving operation for the most part is done by hand, which does not lend itself to a high degree of repetitive accuracy. The lenses are prepared in an optical laboratory by grinding the edges down to the exact shape of a pattern furnished by the frame manufacturer. The lens should exactly fit inside the lens groove but, due to a combination of factors in most instances it will not precisely fit. An improper fit not only sets up unnecessary stresses between the lens and the frame but also creates problems in insertion of the lens and proper positioning of the optical axis of each lens, as will later be described in detail. While the hand cut groove is the primary cause for an improper fit, the pattern can be a contributing factor. After heavy use, the pattern becomes worn or the size of the lens (not the shape) is not correct, by reason of an improper proportion adjustment of the lens edging machine. Unless stored in a controlled humidity environment, nylon frames without lenses are subject to shrinkage.

SUMMARY OF THE INVENTION

The present invention has remedied all of the above mentioned problems with an insert pattern molded in the frame which stays in the frame until the edges of the lenses are to be ground. The lens groove is molded by the edge of the insert, thereby forming a groove which is the exact dimension of the pattern outline. There is no need for the optical lab to stock a pattern or be concerned with pattern wear since each frame has its own pattern. Also the problem of proportional adjustment of the edging machine for different size lenses is not present since a 1:1 ratio is always used. There is no possibility of the frames in stock shrinking with the patterns positioned in the lens groove. When the optical laboratory receives the lens prescription from the doctor, they take the proper size lens frame from their stock; snap the insert patterns out of the frame and place the insert pattern on the edging machine in place of the conventional pattern.

The insert pattern further assists in fitting the prescription by providing vertical and horizontal reference lines locating the mechanical center of the lens opening. The distance between the mechanical centers of each lens is matched as close as possible with the PD (pupillary distance) of the patient being fitted. In each prescription, the optical center of each lens is usually offset from the mechanical center so that the center of the patient's pupils will be in direct alignment with the optical center of each lens.

It is therefore the primary object of the present invention to provide an improved eyeglass frame with a molded lens groove dimensioned precisely to fit the edge of the future lens.

Another object of the invention is to provide a disposable lens pattern which assists in accurately edging corrective lenses.

A further object of the invention is to provide removable lens pattern inserts in eyeglass frames with indexing means on the inserts to assist in fitting and preparing corrective eyewear.

Another object of the invention is to provide a more simplified method of edging corrective eyeglass lenses which is less subject to error and breakage.

The invention, and its various objects and advantages, will be more clearly understood when the following description is read in connection with the accompanying drawings, in which.

Figure 2:
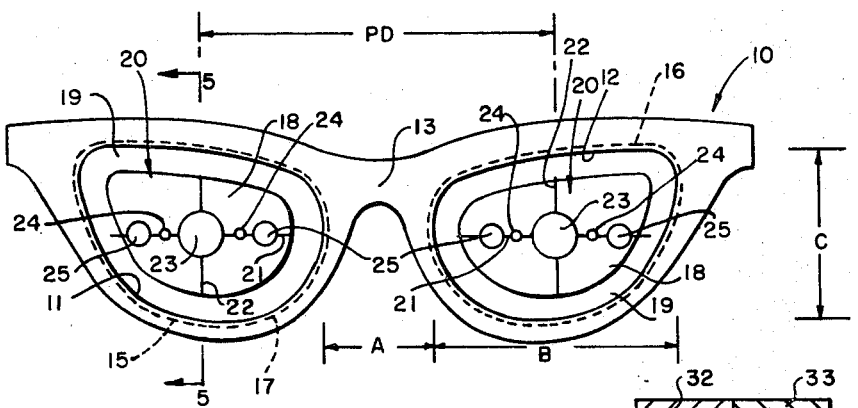
FIG. 2 is a front elevational view of an eyeglass frame with the pattern inserts inserted in the frame, illustrating the present invention.
Figure 4:
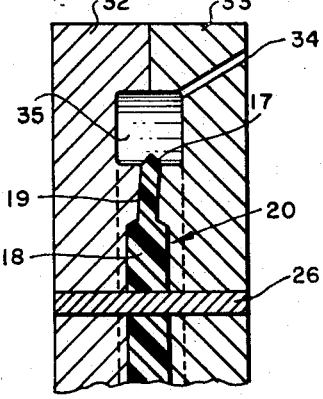
FIG. 4 is a fragmentary section through a lens frame mold with the pattern insert sandwiched between the halves of the mold.
Figure 5:
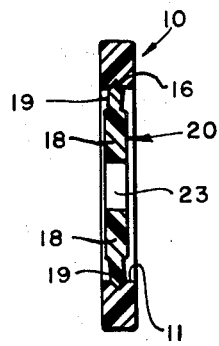
FIG. 5 is a sectional view taken along line 5—5 of FIG. 2.

Referring to the drawings for a detailed description of the invention, and more specifically to FIGS. 2 and 5, an eyeglass frame is generally identified by reference numeral 10. The frame 10 includes two lens openings 11 and 12 separated by a bridge portion 13. Surrounding the inside of the openings are lens grooves 15 and 16. Positioned in each of the lens openings are removable insert patterns 20. The lens grooves 15 and 16 are molded in the frame by the beveled edge 17 of the pattern insert 20 (FIG. 4), as further described in connection with the molding operation of the frame. The insert 20 has a flat base portion 18 surrounded by a periphery portion 19 with a slight curvature, as illustrated in FIGS. 4 and 5. The curvature conforms to the shape of a median curvature lens, as for example a 6.00 diopter radius. Scribed in the surface of the base portion 18 are horizontal and vertical axis lines 21 and 22, which together locate the mechanical center of the lens opening. The mechanical center is the halfway point between the lens height C and lens width B. Concentric with the mechanical center is an opening 23 which receives the spindle for the lens edging machine, not shown. Positioned along the horizontal axis line 21, equally spaced from the opening 23, are two pairs of openings 24 and 25. Openings 24 receive locking pins (not shown) which hold the insert 20 from rotating when positioned on the lens edging machine spindle. Openings 25 receive a pair of alignment pins 26 during the molding process, as further described in conjunction with FIG. 4.

Figure 3:
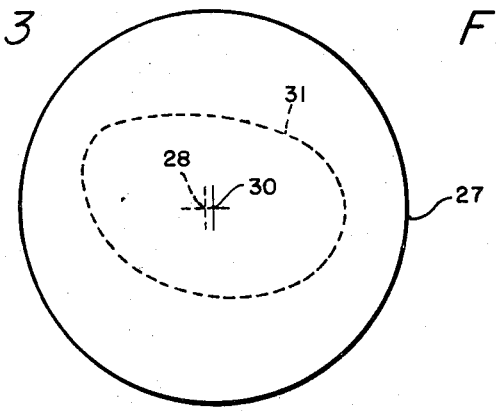
FIG. 3 is a plan view of a lens blank prior to edging, with the finished shape of the lens shown in dotted line.

FIG. 3 illustrates a round lens blank 27 having an optical center 28. The outline 31 of the particular lens, for the FIG. 2 frame, is illustrated in dotted line with the mechanical center 30 of the lens offset from the optical center 28.

Figure 1:
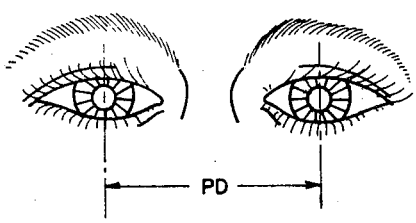
FIG. 1 is an elevational view illustrating the spacing dimension between a persons eyes used in fitting eyewear.

The spacing of a person's eyes, as shown in FIG. 1, will vary with each individual patient. The optician initially measures the pupillary distance, hereinafter referred to as PD, which is the distance from the center of one pupil to the center of the other pupil while the eyes are focused on a distant object. The PD will, of course, decrease when the eyes are focused on a close-up object, such as a book.

When fitting a patient for corrective lenses, a frame is selected with a PD that is as close as possible to the patient's distant PD. Lens frames are made in two variable dimensions. The first is the bridge dimension A, and the second is the lens width dimension B. As can be readily seen from FIG. 2, the dimensions $A+B$ equal the PD, since the vertical centerline 22 divides the lens width in half. If, for example, the patient's PD is 67 mm. and the closest frame PD is 65 mm., the patient's eyes will each be 1 mm. offset from the mechanical center of the lens openings. The optical center of the lens must be in substantial alignment with the patient's eyes. If the frame PD was exactly the same as the patient's eyes there would be no need for adjustment and the optical center and mechanical center would be the same. However, in the present example, the optical center 28 must be offset 1 mm. to the outside of the mechanical center 30, as seen in FIG. 3, on each lens, to give an effective PD of 67 mm.

MOLDING PROCESS OF THE FRAME

FIG. 4 illustrates the insert 20 accurately positioned on close fitting pins 26 and sandwiched between the halves 32 and 33 of an injection mold. Nylon in the fluid state, at approximately 500° F., is injected into the mold through passage 34 under a pressure of approximately 20,000 p.s.i. The insert 20 which extends into the mold cavity 35 is made of Bakelite or a similar plastic that will not adhere to the lens frame or deform under the molding temperatures and pressures. When the frame is removed from the mold the insert 20 is left in place in its self-formed groove 16.

USE OF THE INSERT PATTERNS

With the pattern 20 positioned in the frames, the optician can readily measure the actual PD of the frame through the use of indexing lines 22. This is very helpful since many of the frames manufactured today are not the exact size that they are marked. When the lenses are ready to be edged, the inserts 20 are removed from the frame 10 by the same conventional methods used to insert and remove lenses. The insert 20 is placed in the lens edging machine with its spindle and locking pins passing through openings 23 and 24 of the insert. With the insert 20 functioning as a pattern, the round lens blank 27, as seen in FIG. 3, is ground down to the precise shape 31 of the lens groove 15 in the frame. There is no danger of a proportional error in size since the insert pattern 20 is the same size as the lens. The average corrective lens will have a curvature (diopter radius) almost identical with the periphery portion 19 of the insert pattern. The molded lens groove 16 will therefore have the precise curve and shape as the edged lens within a tolerance of 0.1 of a millimeter. Due to the precise fit of the lens in the frame, the lenses are more easily inserted and axially aligned in the frame without stresses therebetween.

Having described the invention with sufficient clarity to enable those familiar with this art to construct and use it, we claim:

1. A pattern insert which is removably molded in the lens opening of an eyeglass frame to form the lens groove and when removed provides a lens pattern, comprising:
   a substantially planar member made of a rigid material which will not shrink due to humidity changes or adhere to the molded frame during the molding process, the planar member having a flat center portion means on the center portion for mounting the member on the spindle of a lens grinding machine, surrounded by a periphery portion, the periphery portion having a beveled edge dimensioned to the precise outline of the lens to be inserted in the frame, the periphery portion being curved at a diopter radius to substantially conform with the curvature of the lens to be inserted.

2. A pattern insert as set forth in claim 1, wherein the insert is made of Bakelite plastic.

3. A pattern insert as set forth in claim 1 including indexing means on the center portion of the planar member with horizontal and vertical axes establishing the mechanical center of the lens opening whereby any necessary offsetting of the optical center of the lens can be accurately computed and the frame size instantly checked.

4. A pattern insert as set forth in claim 1 wherein the member includes mounting means for positioning the member in a frame forming mold.

References Cited

UNITED STATES PATENTS

| 1,672,573 | 6/1928 | Maynard | 55—101.1 |
| 3,145,417 | 8/1964 | Shatzel. | |
| 3,313,031 | 4/1967 | Lowe. | |
| 3,406,232 | 10/1968 | Barker | 351—178 X |

OTHER REFERENCES

The Effect of the New, OMA Standards on Writing and Filling Eyewear Orders, reprinted from The Optical Journal and Review of Optometry, July 15, 1961 thru Sept. 15, 1961, pp. 5–9.

LEONARD FORMAN, Primary Examiner

D. A. DEARING, Assistant Examiner

U.S. Cl. X.R.

264—328